United States Patent [19]

Hill

[11] Patent Number: 4,494,400

[45] Date of Patent: Jan. 22, 1985

[54] WHEEL BALANCER TWO PLANE CALIBRATION APPARATUS AND METHOD

[75] Inventor: Jerry M. Hill, North Little Rock, Ark.

[73] Assignee: FMC Corporation, Chicago, Ill.

[21] Appl. No.: 518,164

[22] Filed: Jul. 28, 1983

[51] Int. Cl.$^3$ .............................................. G01M 1/22
[52] U.S. Cl. ........................................ 73/1 B; 73/462
[58] Field of Search ................... 73/1 B, 462; 364/571

[56] References Cited

U.S. PATENT DOCUMENTS

| 2,851,885 | 9/1958 | Federn et al. | 73/1 B |
| 3,077,781 | 2/1963 | Silver | 73/465 |

Primary Examiner—James J. Gill

Attorney, Agent, or Firm—H. M. Stanley; R. B. Megley

[57] ABSTRACT

A dynamic balancing machine having a rotatably driven mounting shaft for articles to be balanced has a fixture upon which known weights are mounted at two known calibration planes ralative to the shaft. Data taken by force sensors coupled to the shaft during two shaft spins with the known weights mounted in each calibration plane are used to calculate sensor output correction factors applied to unbalance data taken during the spin of a mounted unbalanced article for a pair of unbalance measurement planes spaced along the shaft. The unbalance calibration and measurement planes are axially displaced along the shaft from the location of the force sensors. The disclosure is directed toward apparatus and method for obtaining machine calibration.

15 Claims, 2 Drawing Figures

FIG_1

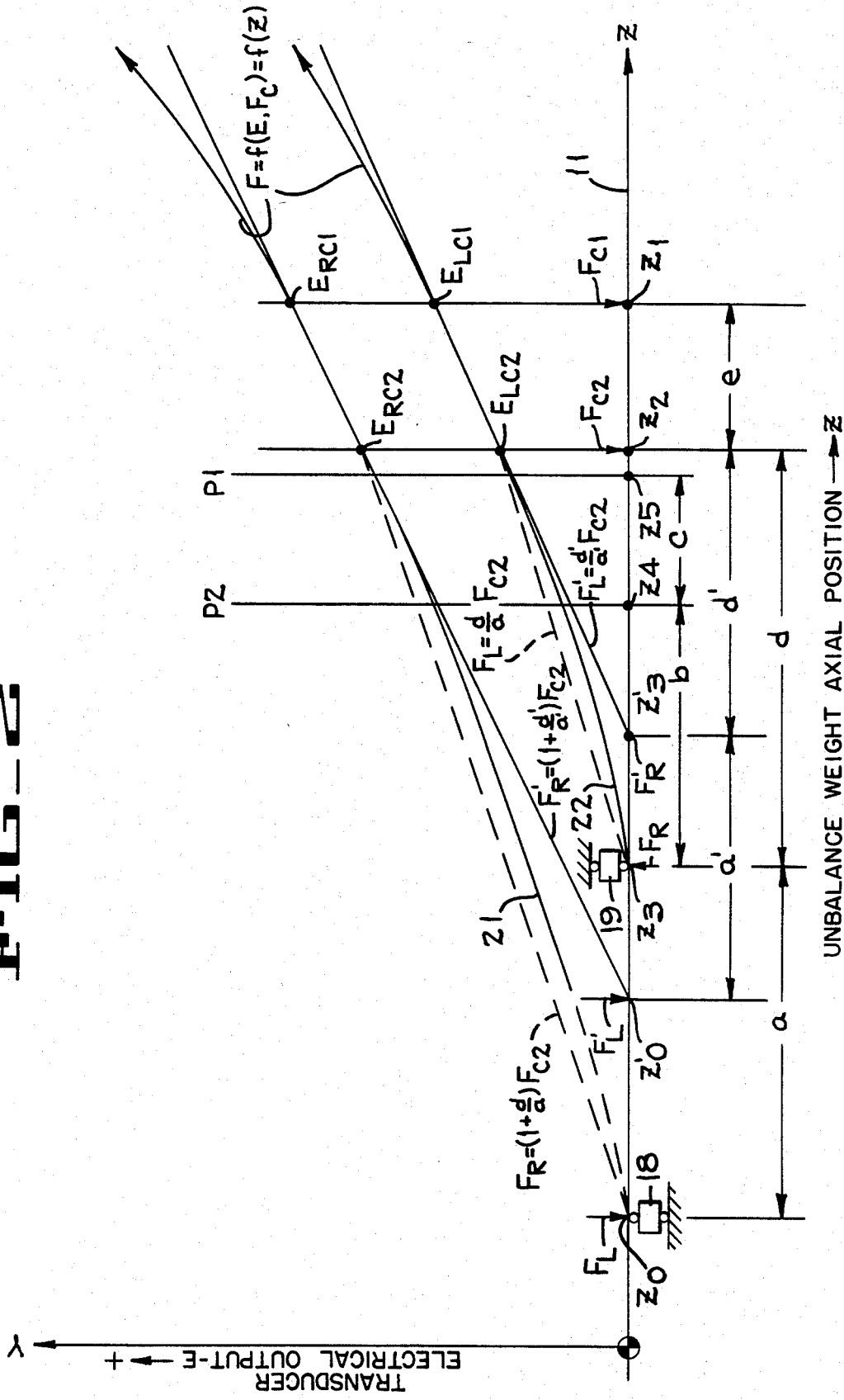

4,494,400

WHEEL BALANCER TWO PLANE CALIBRATION APPARATUS AND METHOD

BACKGROUND OF THE INVENTION

1. Field of the Invention

This invention relates to a system for measuring and displaying unbalance in a rotating body and more particularly to such a system which has the capability of measuring and providing correction quantities for system imposed unbalanced measurement errors.

2. Description of the Prior Art

U.S. Pat. No. 4,285,240, Gold, issued Aug. 25, 1981 discloses an off-the-car wheel unbalance measuring system having a rotationally driven wheel mounting shaft supported in a pedestal. A pair of force transducers are mounted in the pedestal adjacent to and spaced axially along the shaft. The force transducers are coupled mechanically to the shaft and provide periodic electrical output signals indicative of unbalance forces transmitted through the shaft when the shaft is driven rotationally. The angular position of the shaft is monitored with respect to an angular reference position at a predetermined number of angular increments during each full revolution of the shaft. The transducer output signals are converted to digital form in electrical circuitry within the system and calculations are performed on the digitized signals at each angular increment using sine and cosine representative factors corresponding to the particular angular increment. The sine and cosine factors are stored in memory and are called up from storage in accordance with the monitored angular position of the shaft. This system operates to provide operating data from which unbalance force magnitude and angular position may be calculated. Operation of the system while a known unbalance is mounted on the shaft provides data from which calibration constants for the system may be calculated. The system may also be operated while the shaft is running free and data collected which is indicative of the unbalance in the shaft itself. These data may thereafter be used to provide error correction for operating data wherein the errors accrue from transducer idiosyncrasies and/or inherent shaft unbalance.

SUMMARY OF THE INVENTION

The present invention is directed to apparatus and method for calibrating a balancing machine for dynamically balancing objects which are rotatable on a shaft included in the machine. A first means is provided for mounting a known mass at a known radial position and at a first known axial position on the shaft. A second means is provided for mounting a known mass at a known radial position at a second known axial position on the shaft. Sensor means is provided for detecting force caused by mass unbalance monted on the shaft when it is rotated. Means is coupled to the sensor means for computing the mass unbalance and for comparing the computed with the known mass unbalance when the known masses are mounted on the machine, whereby correction factors for a specific sensor means may be obtained from the comparison.

The invention is further directed to a method of calibrating a dynamic mass unbalance detection machine having a shaft which is rotatably driven about a spin axis and a pair of force sensors which provide outputs indicative of force resulting from unbalance loads during shaft rotation and which are axially spaced along and mechanically coupled to the shaft. The sensor outputs are electrically coupled to a computer. The method includes mounting a known mass on the shaft at a known radius from the spin axis and in a plurality of successive known axially spaced mass unbalance calibration planes. The shaft is then spun a plurality of times, once for each of the successive axially spaced calibration planes. Data indicative of force sensor outputs are stored from each calibration plane spin. The relationships are computed between unbalance force and data as a function of axial shaft position, whereby quantities are obtained which may be used to provide calibration data to reduce error content in detected unbalance in predetermined mass unbalance correction planes.

The invention is also directed to a method of calibrating a dynamic mass unbalance detection machine having a shaft rotatably driven about a spin axis and a pair of force sensors providing outputs indicative of force resulting from unbalance loads during shaft rotation, wherein the sensors are axially spaced along and mechanically coupled to the shaft. The sensor outputs are electrically coupled to a computer. The method includes the steps of mounting a known mass on the shaft at a known radius from the spin axis and in a first known mass unbalance calibration plane. The shaft is spun a first time. Data indicative of the sensor outputs during the first spin are stored. A known mass is mounted on the shaft at a known radius from the spin axis and in a second known mass unbalance calibration plane. The shaft is spun a second time. The apparent axial separation and axial positions of the sensors are computed using the data indicative of the force sensor outputs from the first and second spins, so that error content is reduced in detected unbalance in predetermined mass unbalance correction planes.

BRIEF DESCRIPTION OF THE DRAWINGS

FIG. 1 is a diagrammatic elevation view of the unbalance measurement system of the present invention.

FIG. 2 is a graphic depiction of the relationship between force and sensor output as a function of axial shaft position.

DESCRIPTION OF THE PREFERRED EMBODIMENTS

The invention disclosed herein is for use in a dynamic balancing machine, typified by the conventional mechanical arrangement shown in U.S. Pat. No. 4,285,240 mentioned previously. The machine provides for measurement of unbalance mass in a rotating body when the unbalance mass produces an unbalance force when the body is rotated by the machine. Typically an automobile rim and tire combination provides the article to be balanced. The rim and tire combination is securely mounted against a shoulder on a spin shaft in the machine. The rim portion of the rim and tire combination has the usual centrally disposed hole which fits over the end of the shaft and the rim is held tightly in place on the shaft by a wheel clamp which engages threads formed on the shaft end. A pair of bearing housings are supported within machine framework. Bearing members within the bearing housings support the shaft within the framework so that the shaft is disposed for rotational motion within the framework. Left and right force transducers are positioned between the framework and the bearing housings and the transducers are maintained in continuous contact with the housings. In this fashion forces arising by reason of rotation of an unbalanced article mounted on the machine shaft are sensed by the transducers and electrical outputs are provided thereby.

The machine also includes structure associated with the shaft for providing data indicative of the instantaneous position of the shaft. The shaft is driven by a motor through a belt and pulley arrangement. Controls are provided for initiating rotation in the shaft as well as for selecting the various funtions performed by the machine, such as operations to detect unknown unbalance, to obtain transducer calibration or to detect zero shaft unbalance, to name a few. Other functions are described in the aforementioned U.S. Pat. No. 4,285,240.

A phasor is defined as an alternating quantity conveniently represented by a projection of a rotating line on a fixed axis. The unbalance forces caused by rotation of an unbalanced mass mounted on the machine will be described herein as phasors, wherein they will be conveniently represented by instantaneous projections of the phasor on orthogonal x and y axes. Unbalance phasors may be caused by unknown mass unbalance in a rotating body being measured, known calibration weight mass unbalance, or unloaded or free running shaft unbalance as the shaft is rotated. Fundamental x and y components of the rotating mass unbalance phasors may be recovered substantially noise free and measured as described in the aforementioned U.S. Pat. No. 4,285,240. With this in mind, the unbalance measurement equations for a rotating body will be reviewed presently.

By way of review of the pertinent portion of the machine, FIG. 1 shows a shaft 11 mounted in a framework represented at 12. The shaft may be selectively driven rotationally through a pulley 13 fixed to the shaft, a belt 14 surrounding the pulley and engaging a pulley 16 on the end of a shaft which is driven by a frame mounted motor 17. The shaft is mounted in bearings within the framework as hereinbefore described, and left and right force sensors or transducers 18 and 19 respectively are mechanically coupled to the shaft. Force exerted on the left transducer is shown as $F_L$ and on the right transducer as $F_R$. The axial spacing between the left and right force sensors ($Z_0$ to $Z_3$) is shown as a. A pair of mass unbalance correction planes P2 and P1 are shown in FIG. 1 intersecting the axis of the shaft at points $Z_4$ and $Z_5$ respectively. The unbalance correction planes are separated by a distance c and the left correction plane P2 is displaced by the distance b from the axial location $Z_3$ of the right transducer 19. Dynamic unbalance measurement is obtained for an article for which mass unbalance has been detected by converting the sensed unbalance data to unbalance correction weight to be applied at a point in each of the correction planes, so that not only radially directed mass unbalance is compensated, but unbalance couples about an axis orthogonal to the spin axis are also compensated.

It may also be seen in FIG. 1 that a pair of mass unbalance calibration planes $Z_2$ and $Z_1$ intersecting the shaft spin axis are shown separated by a distance e. The left calibration plane $Z_2$ is spaced from the right transducer 19 at $Z_3$ by a distance d. Calibration forces $F_{C1}$ and $F_{C2}$ are shown in the calibration planes $Z_2$ and $Z_3$ respectively. The manner in which these calibration forces are obtained and the purpose to which they are put will be hereinafter described. It should be noted that the calibration planes $Z_2$ and $Z_1$ are shown as displaced from the unbalance correction planes P2 and P1 in FIG. 1 for illustrative purposes only. The unbalance calibration planes may take various positions relative to the unbalance correction planes, ranging from coincidence with typical unbalance correction planes to positions to the left or right (as shown), or any intermediate positions therebetween. It should be noted in FIG. 1 that the vertical direction may be denoted the y direction, the direction orthogonal to the plane of the paper the x direction, and the horizontal direction the z direction.

With reference now to FIG. 2 of the drawings, the horizontal axis is also designated the z axis and corresponds to the center line of the shaft 11. The vertical axis in FIG. 2 is designated the y axis, and the axis orthogonal to the plane of the paper is designated the x axis. The left and right transducers or force sensors, 18 and 19 respectively, are shown in FIG. 2. Mass unbalance correction planes P2 and P1 and mass unbalance calibration planes $Z_2$ and $Z_1$ are shown in FIG. 2 in the same relative positions they occupy in FIG. 1. The force exerted on the left force transducer 18, $F_L$ and the force exerted on the right force transducer 19, $F_R$, are shown exerted at shaft axial positions $Z_0$ and $Z_3$ respectively.

It should be noted that shaft angle is known at any point in time and therefore the x and y components of the unbalance force phasors (and therefore the transducer output signal phasors) are attainable at any point in time. In the following, the symbols $\overline{F}$, $\overline{E}$ and $\overline{K}$ will be used to represent the force, transducer output signal and correction phasors respectively. The correction phasor is required because experience teaches that the transducer output is not quite in phase with the force exerted thereagainst, and the output magnitude is not exactly the same from transducer to transducer. The correction phasor is therefore necessary to provide phase and scale factor correction for the transducer output signals.

In complex exponential notation the following relationships apply:

$$F = Fe^{jwt}$$

$$E = Ee^{j(wt-\theta)}$$

IF $K = Ke^{j\theta}$ AND $KE = F$

THEN $KE = KEe^{jwt} = Fe^{jwt} = F$ \hfill (1)

We have therefore defined the correction constant $\overline{K}$.

Choosing the transducer output phasor $\overline{E}$ for this example to lag in phase behind the force phasor $\overline{F}$, the relationships (1) may be expanded as follows:

$$\overline{F} = KEe^{jwt} = KE(\cos wt + j\sin wt) \hfill (2)$$

$$\overline{F} = (K_x + JK_y)(E_x - JE_y)$$

AND $$K_x + JK_y = \frac{\overline{F}(E_x + JE_y)}{E_x^2 + E_y^2}$$

For one transducer extracting real components provides the following relationship:

$$K_x = \frac{FE_x}{E_x^2 + E_y^2} \quad (3)$$

Extracting imaginary components from the relationship (2) provides the following:

$$K_y = \frac{FE_y}{E_x^2 + E_y^2} \quad (4)$$

Expanding both sides of relationship (1) provides the following relationship:

$$\overline{F} = F_x + JF_y = (K_x + JK_y)(E_x - JE_y) \quad (5)$$
$$= K_xE_x + K_yE_y + J(K_yE_x - K_xE_y)$$

Extracting real components from relationship (5) provides the following:

$$F_x = K_xE_x + K_yE_y \quad (6)$$

Extracting imaginary components from the relationship (5) provides the following:

$$F_y = K_yE_x - K_xE_y \quad (7)$$

It should be noted that relationships 6 and 7 are for one transducer only.

Referring now to FIG. 2, a general solution for $F_L$, $F_R$, $F'_L$ and $F'_R$ is undertaken together with an explanation of the advantages obtained by computing the latter two quantities. As disclosed in the U.S. Pat. No. 4,285,240 to which reference is made hereinbefore, calibration of the transducers 18 and 19 is undertaken by rotating a single known unbalance on the shaft 11 at, in this example, the plane $Z_2$ seen in FIG. 2. When such a calibration spin is undertaken, the forces $F_L$, $F_R$ and $F_{C2}$ are present in planes substantially orthogonal to the axis of shaft 11 at points $Z_0$, $Z_3$ and $Z_2$ respectively. A summation of the forces (with upwardly directed forces being positive) results in the following:

$$-F_L + F_R - F_{C2} = 0$$

$$F_R = F_L + F_{C2}$$

A summation of the moments about $Z_3$ (with clockwise moments assigned a positive sense) results in the following:

$$-F_L a + F_{C2} d = 0$$

$$F_L = (d/a) F_{C2} \quad (8)$$

$$F_R = (d/a + 1) F_{C2} \quad (9)$$

The relationships (8) and (9) result. These relationships may be seen to be straight line or linear relationships in FIG. 2 extending from the point $E_{LC2}$ to the point $Z_3$ (8), and extending from the point $E_{RC2}$ to the point $Z_0$ (9). These linear relationships are shown in dashed lines in FIG. 2 and may be seen to be functions of known dimensions in the z direction as well as the known calibration force, $F_{C2}$.

The actual relationship between force and transducer output as the plane in which an unbalance weight moves in the z direction is shown by the curves 21 and 22 for the right and left transducers respectively in FIG. 2. These curves are obtained by mounting known calibration weights on the shaft at known axial positions and observing the transducer outputs.

The curve 21 is generated by looking at the output of the right transducer 19 as a calibration weight is positioned at a plurality of points along the z axis. The left end of the curve 21 appears as a dashed line because axial test point locations for the calibration weight go only just to the left of the right transducer 19 in actual practice. Therefore the curve 21 is extrapolated to the point $Z_0$ at the axial location of the left transducer. It may be seen intuitively that $F_R$ would have to be zero if the calibration weight was placed in a plane including $Z_0$, because theoretically all of the unbalance would be sensed by the left transducer 18.

The actual curve 22 for the $F_L$ is generated in the same fashion as is used to generate curve 21. Again, if all of the calibration weight was in the plane including point $Z_3$ the output from transducer 18 would be zero and all the output would be provided by the right transducer 19. The curves may be seen to be concave upwardly and to depart to some extent from the straight line relationships (8) and (9). As a consequence, it may be seen that the value on the line representing the last two mentioned relationships is an approximation and departs from the actual relationships 21 or 22 at the mass unbalance correction plane P2. This departure or deviation represents an error imposed in the measured unbalance in plane P2.

As mentioned previously the mass unbalance calibration planes $Z_2$ and $Z_3$ are shown in FIG. 2 displaced from mass unbalance correction planes P2 and P1 for purposes of clarity. Calibration planes may be positioned at other intersections with the z axis of FIG. 2 and could be made to coincide with unbalance correction planes P2 and P1. An unbalance weight calibration fixture 23 is shown in dashed lines in FIG. 1 having known calibration weights W1 and W2 mounted thereon in calibration planes $Z_1$ and $Z_2$ and at known radii from the spin axis of shaft 11. However, since the unbalance correction planes P2 and P1 depend upon the configuration of the article being balanced, the points $Z_4$ and $Z_5$ will change in position on the z axis from article to article.

When known calibration weights are spun on the shaft 11 in one of the planes $Z_1$ or $Z_2$ and then the other, the left transducer 18 provides an output $E_{LC1}$ and $E_{LC2}$ and the right transducer 19 provides an output $E_{RC1}$ and $E_{RC2}$. Since the positions $Z_1$ and $Z_2$ are known, the calibration forces $F_{C2}$ and $F_{C1}$ are known, and the aforementioned transducer outputs are measured, the z direction dimensions a' and d' seen in FIG. 2 may be defined as follows:

$$\frac{E_{LC2}}{d'} = \frac{E_{LC1}}{d' + e} \quad (10)$$

$$d' = \frac{eE_{LC2}}{E_{LC1} - E_{LC2}}$$

$$\frac{E_{RC1}}{a' + d' + e} = \frac{E_{RC2}}{a' + d'} \quad (11)$$

$$a' = -d' + e\frac{E_{RC2}}{E_{RC1} - E_{RC2}}$$

By analogy to relationships (8) and (9), the following relationships for $F'_L$ and $F'_R$ may be made $$F'_L = (d'/a') F_{C2} \quad (12)$$

$$F'_R = (1 + d'/a') F_{C2} \quad (13)$$

$$F_L = F_{C2}\left(\frac{E_{LC2}(E_{RC1} - E_{RC2})}{E_{RC2}E_{LC1} - E_{LC2}E_{RC1}}\right) \quad (14)$$

$$F_R = F_{C2}\left(1 + \frac{E_{LC2}(E_{RC1} - E_{RC2})}{E_{RC2}E_{LC1} - E_{LC2}E_{RC1}}\right). \quad (15)$$

Relationships (14) and (15) show that $F'_L$ and $F'_R$ are functions of a known calibration force $F_{C2}$ and measured transducer output values E.

The straight line functions (12) and (13) are shown in FIG. 2 as $F'_R$ and $F'_L$ extending through the points $(E_{RC1}, E_{RC2})$ and $(E_{LC1}, E_{LC2})$ respectively. These straight line relationships intersect the z axis at $Z'_0$ and $Z'_3$, which represent the apparent locations of the transducers 18 and 19. Their apparent separation in the z direction is $a'$ and the apparent distance in the z direction from $Z'_3$ to $Z_2$ is noted as $d'$. Thus, the apparent axial separation between the transducers 18 and 19 and the apparent axial positions of the transducers relative to the calibration plane through the point $Z_2$ are known. The deviation of the relationships $F'_R$ and $F'_L$ from the actual curves 21 and 22 in the unbalance correction plane P2 may be seen to be considerably less than the deviation of the straight lines $F_R$ and $F_L$ from curves 21 and 22 in plane P2. Therefore the error content in detected unbalance in the mass unbalance correction planes is reduced.

Alternatively relatively precise calibration for the transducers 18 and 19 may be obtained for specific mass unbalance correction planes P2 and P1 by taking the calibration data while one unbalance calibration plane is coincident with plane P2 and the other is coincident with plane P1. This procedure would require a calibration run for each set of mass unbalance correction planes P2 and P1.

As shown, the straight line relationships for $F'_L$ and $F'_R$ are good approximations of the curves 22 and 21 respectively in the regions from $Z_4$ through $Z_1$. If higher degrees of accuracy are required, then the straight line approximations $F'_R$ and $F'_L$ could give way to construction of the actual curves 21 and 22 by undertaking a sufficiently large number of calibration spins with the calibration weight being moved incrementally in the z direction. Precise calibration data could then be obtained for any axial location of mass unbalance correction planes P2 and P1.

The linear relationships $F'_R$ and $F'_L$ appear practically parallel in that portion of the curves depicted in FIG. 2, but may be seen from the relationships themselves to converge at infinity.

The calibration constants themselves are obtained by combining relationships (3) and (12) and by combining relationships (4) and (13). The following results are obtained:

$$\left.\begin{array}{l}K_{LX} = \dfrac{(d'/a')F_{CZ}E_{LXC}}{E_{LXC}^2 + E_{LYC}^2} \\[6pt] K_{LY} = \dfrac{(d'/a')F_{CZ}E_{LYC}}{E_{LXC}^2 + E_{LYC}^2} \\[6pt] K_{RX} = \dfrac{(1 + d'/a')F_{CZ}E_{RXC}}{E_{RXC}^2 + E_{RYC}^2} \\[6pt] K_{RY} = \dfrac{(1 + d'/a')F_{CZ}E_{RYC}}{E_{RXC}^2 + E_{RYC}^2}\end{array}\right\} \quad (16)$$

In the relationships (16) it should be noted that there are x and y components for the calibration constants for the left transducer 18 and the right transducer 19. The quantity $E_{LXC}$ for example, describes the x component of the left transducer output with the calibration weight in unbalance calibration plane $Z_2$.

Applying the calibration constants of the relationships (16) to the general force transducer equations for the x and y components, (6) and (7) respectively, the following is obtained:

$$\left.\begin{array}{l}F_{LX} = K_{LX}E_{LX} + K_{LY}E_{LY} \\ F_{LY} = K_{LY}E_{LX} - K_{LX}E_{LY} \\ F_{RY} = K_{RX}E_{RX} + K_{RY}E_{RY} \\ F_{RX} = K_{RY}E_{RX} - K_{RX}E_{RY}\end{array}\right\} \quad (17)$$

It may therefore be seen that the calibration constants obtained by the use of the foregoing described apparatus and method may be applied to the transducer data to obtain data indicative of the unbalance force in an article being spun on the shaft 11, which data is thereby corrected for errors in the transducer output due to transducer idiosyncrasies and physical placement along the shaft relative to the mass unbalance correction planes.

If the shaft assembly 11 is not mechanically balanced (for example by means of turning the shaft assembly itself on a balancer and removing shaft assembly material to obtain dynamic balance) a zero balance spin, or unloaded shaft spin may be undertaken as described in the aforementioned U.S. Pat. No. 4,285,240. The residual shaft unbalance quantities may be stored for use in removing the effects of such residual unbalance from data obtained in the machine calibration steps described herein or from unknown unbalance measurements taken for articles being balanced. If $E_{LXCU}$ and similar terms correspond to $E_{LXC}$ and similar terms uncalibrated, and if $E_{LXCO}$ is $E_{LX}$ with no shaft load, then:

$$\left.\begin{array}{l}E_{LXC} = E_{LXCU} - E_{LXCO} \\ E_{LYC} = E_{LYCU} - E_{LYCO} \\ E_{RXC} = E_{RXCU} - E_{RXCO} \\ E_{RYC} = E_{RYCU} - E_{RYCO}\end{array}\right\} \quad (18)$$

In like fashion where $E_{LXU}$ and similar terms correspond to $E_{LX}$ and similar terms uncalibrated, then:

$$\left.\begin{aligned} E_{LX} &= E_{LXU} - E_{XCO} \\ E_{LY} &= E_{LYU} - E_{LYCO} \\ E_{RX} &= E_{RXU} - E_{RXCO} \\ E_{RY} &= E_{RYU} - E_{RYCO} \end{aligned}\right\} \quad (19)$$

It should be noted that in the relationships (18) and (19) the quantities on the left of the relationships are calculated from the quantities on the right which are measured.

The manner in which the data acquired by means of the description herein is transposed to the mass unbalance correction planes P2 and P1 for indication of unbalance measurements in those planes, and the computation of the compensating weights and angular positions for weight applications in the correction planes is described in the aforementioned U.S. Pat. No. 4,285,240, columns 8, 9 and 10.

Although the best mode contemplated for carrying out the present invention has been herein shown and described, it will be apparent that modification and variation may be made without departing from what is regarded to be the subject matter of the invention.

What is claimed is:

1. Apparatus for calibrating a balancing machine for dynamically balancing objects rotatable on a shaft thereon, comprising
   first means for mounting a known mass at a known radial position and at a first known axial position on the shaft,
   second means for mounting a known mass at a known radial position and at a second known axial position on the shaft,
   sensor means for detecting force caused by mass unbalance mounted on the shaft when it is rotating,
   means coupled to said sensor means for computing the mass unbalance during a first calibration spin with said known mass in said first axial position and during a second calibration spin with said known mass in said second axial position and for comparing the computed with the known mass unbalances when said known masses are sequentially mounted on the machine, whereby correction factors for a specific sensor means may be obtained from the comparison.

2. Apparatus as in claim 1 wherein said first and second means for mounting comprise a wheel rim-like fixture adapted to be mounted on the shaft and a plate attached to the periphery thereof having a plurality of axially spaced mounting positions thereon and providing said first and second known axial positions.

3. Apparatus as in claim 1 wherein said first and second means for mounting comprise first and second separate plates alternatively mountable on the shaft.

4. A method of calibrating a dynamic balancing machine for detecting mass unbalance in objects mounted on a rotatably driven machine shaft, wherein a pair of sensors are spaced along and coupled to the shaft and provide outputs indicative of unbalance during shaft rotation, and wherein the sensor outputs are coupled to a computer which provides unbalance force magnitude and phase information, comprising the steps of
   mounting a known mass at a known radius and a first known axial position on the shaft,
   spinning the shaft a first time,
   storing the sensor outputs,
   mounting a known mass at a known radius and a second known axial position on the shaft,
   spinning the shaft a second time,
   computing the apparent axial separation between the sensors and the apparent axial positions of the sensors utilizing the outputs obtained from the first and second shaft spins, whereby magnitude and phase information with reduced error content may be detected relative to unbalance mass in machine shaft mounted objects at predetermined axially located planes.

5. A method as in claim 4 together with the steps of spinning the shaft with no load mounted thereon, storing the no load sensor outputs, and correcting the outputs from the first and second shaft spins with the no load outputs.

6. A method as in claim 4 wherein the step of computing comprises the step of using a straight line relationship in the computations involving the outputs obtained from the first and second shaft spins.

7. A method as in claim 4 wherein the steps of mounting known masses at first and second known axial positions comprise the steps of selecting the first and second axial positions to be substantially in the predetermined axially located unbalance mass detection planes.

8. A method of calibrating a dynamic mass unbalance detection machine having a shaft rotatably driven about a spin axis and a pair of force sensors providing outputs indicative of force resulting from unbalance loads during shaft rotation and being axially spaced along and mechanically coupled to the shaft, wherein the outputs are electrically coupled to a computer, comprising the steps of
   mounting a known mass on the shaft at a known radius from the spin axis and in a first known mass unbalance calibration plane,
   spinning the shaft a first time,
   storing data indicative of the first spin force sensor outputs,
   mounting a known mass on the shaft at a known radius from the spin axis and in a second known mass unbalance calibration plane,
   spinning the shaft a second time, and computing the apparent axial separation and axial positions of the sensors using the data indicative of the force sensor outputs from the first and second spins, whereby such computed quantities may be used to reduce the error content in detected unbalance in predetermined mass unbalance correction planes.

9. A method as in claim 8 together with the steps of spinning the shaft with no load mounted thereon, storing the no load sensor data, and correcting the data from the first and second shaft spins with the no load data.

10. A method as in claim 8 wherein the step of computing comprises the step of using a straight line relationship in the computations involving data obtained from the first and second shaft spins.

11. A method as in claim 8 wherein the steps of mounting known masses in first and second known mass unbalance calibration planes comprise the steps of selecting the first and second calibration plane and locations to be substantially in the predetermined mass unbalance correction planes.

12. A method of calibrating a dynamic mass unbalance detection machine having a shaft rotatably driven about a spin axis and a pair of force sensors providing outputs indicative of force resulting from unbalance loads during shaft rotation and being axially spaced along and mechanically coupled to the shaft, wherein the outputs are electrically coupled to a computer, comprising the steps of mounting a known mass on the shaft at a known radius from the spin axis and in a plurality of successive known axially spaced mass unbalance calibration planes, spinning the shaft a plurality of times, once for each of the axially spaced calibration planes, storing data indicative of the force sensor outputs from each calibration plane spin, and computing the relationships between unbalance force and data indicative thereof as a function of axial shaft position using the data indicative of the force sensor outputs from the plurality of spins, whereby such computed relationships may be used to provide calibration data to reduce the error content in detected unbalance in predetermined mass unbalance correction planes.

13. A method as in claim 12 wherein the step of computing comprises calling up the calibration data from the computed relationships which correspond to the axial shaft position of the mass unbalance correction planes.

14. A method as in claim 13 wherein the calibration data are obtained in two calibration planes and the computed relationships are assumed to be linear.

15. A method as in claim 12 together with the steps of spinning the shaft with no load mounted thereon, storing the no load sensor data, and correcting the stored data with the no load data.

* * * * *